United States Patent [19]

Stienbarger et al.

[11] Patent Number: 5,110,148

[45] Date of Patent: May 5, 1992

[54] THREE-WHEELED SCOOTER WITH RECIPROCATING TREADLE DRIVE

[75] Inventors: LeRoy Stienbarger, Licking; Frank Gray, St. Louis, both of Mo.

[73] Assignee: Champion Toy Company, St. Louis, Mo.

[21] Appl. No.: 628,405

[22] Filed: Dec. 14, 1990

[51] Int. Cl.$^5$ ............................................. B62M 1/00
[52] U.S. Cl. .................................................. 280/221
[58] Field of Search ............... 280/221, 220, 222, 223, 280/224; 272/73, 114

[56] References Cited

U.S. PATENT DOCUMENTS 1,557,634 10/1925 Walter ................................. 280/221
1,617,357  2/1927 Walter ................................. 280/221
1,977,035 10/1934 Benjamin ............................ 280/221

Primary Examiner—Charles A. Marmor
Assistant Examiner—Kevin Hurley
Attorney, Agent, or Firm—Rogers, Howell & Haferkamp

[57] ABSTRACT

A three-wheeled scooter includes a reciprocating treadle drive which a rider may use to propel the scooter in either the forward or rearward direction. The treadle drive includes a pair of treadles having their rear ends mounted to crank portions of a rear crank drive axle and their forward ends supported by rollers from a bar track having a generally flattened portion therein along with an inclined portion. Movement is achieved by a rider's shifting of his weight alternately from one treadle to the other as each treadle rotates into a driving orientation. The treadle drive is characterized by maintaining a driving relationship between at least one treadle and the crank axle at all times to thereby eliminate any "dead spots".

11 Claims, 2 Drawing Sheets

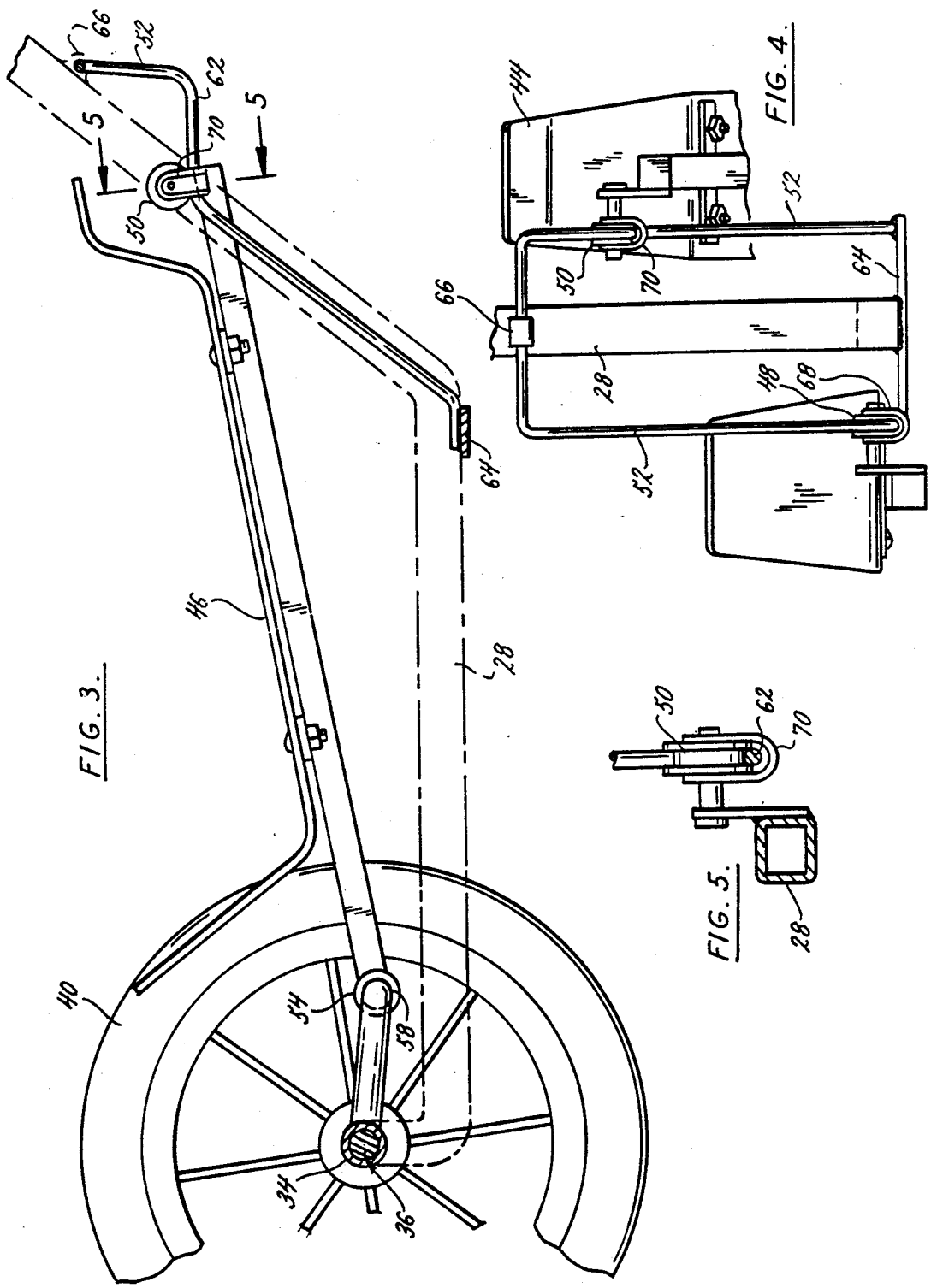

THREE-WHEELED SCOOTER WITH RECIPROCATING TREADLE DRIVE

BACKGROUND AND SUMMARY OF THE INVENTION

Scooters are well known in the art and generally include a platform with a forward wheel and a rear wheel, the forward wheel being generally pivotally mounted with a pair of handlebars for steering. In a variation on the standard well-known scooter, various types of drives have been adapted to the scooter with an extra wheel and drive axle added at the rear thereof in order to provide increased stability. In the prior art, one approach to driving these scooters with a mechanical drive teaches the use of a pair of reciprocating treadles, each of which has an end thereof pivotally secured in a fixed position while the other end oscillates in some manner, generally up and down, to drive a crank axle or the like. In some prior art devices, ratchet mechanisms are used to ensure that the vehicle is driven in only the forward direction. One other prior art device eliminates the generally fixed pivotal mounting of the treadle ends and instead mounts those treadle ends with a second, non-functional, crank arm arrangement such that the treadles maintain their generally horizontal orientation to a much greater extent as the treadles are reciprocated.

While these various designs have been met with some success in the prior art, virtually all, if not all, of these designs suffer from a simplistic drive train which does not adequately deal with the problem of a "dead spot" which is inherently found therein. Typically this "dead spot" exists when one treadle is at the beginning of its stroke while the other treadle is at the end of its stroke. As each treadle typically powers the drive axle or the like through an arc of only 180°, at this balanced point there is a significantly reduced (or even non-existent) torque which can be applied by the rider. Presumably, the designers of these prior art devices relied on the inertia of the rider and scooter to "glide" through this "dead spot". To start from this orientation, the rider pushes the vehicle with his leg to escape this "dead spot". Thus, prior art vehicles generally ignore this "dead spot" as it may be accommodated for. However, this "dead spot" does interfere with the continuous propelling of such a vehicle in that it creates a less than smooth transition from one treadle to the other as the rider shifts his weight to continue propelling the scooter. This undoubtedly creates more interference at slower speeds than at faster speeds, but these slower speeds are generally those most often used by a child with a scooter-type device.

In order to solve these and other problems in the prior art, the inventors herein have succeeded in designing and developing a treadle drive for a scooter which utilizes a unique track and roller mechanism for achieving a driving relationship between each treadle and a crank axle through an arc substantially greater than 180°, and even approaching 270°. Thus, the "dead spot" of the prior art drives is eliminated. This is achieved by a bar-type track which supports a roller secured to the forward end of each treadle, the bar-type track having a generally flattened or horizontal portion thereof at its forward end and an inclined portion extending rearwardly. The rear end of each treadle is secured to the opposing cranks in a crank axle. As the treadle is reciprocated the forward end of the treadle reaches the flat portion of the track and is supported therefrom by its roller so that torque is generated by a pivoting action thereabout. This pivoting action forces the rearward end of the treadle to drive the crank axle downwardly (as the vehicle is propelled in the forward direction). The treadle then moves off this flattened portion and onto the backward inclined portion such that continued downward movement of the treadle drives the crank axle past its six o'clock position by the weight of the rider. With this arrangement, as the treadles are reciprocated, each treadle thus drives its associated crank from a position just past its twelve o'clock orientation to a position near its nine o'clock position. As each treadle remains in a driving relationship with the crank axle through greater than 180°, there is an overlap between the treadles and a smooth transition between treadles results. Furthermore, there is no "dead spot", as in the prior art, as at least one treadle is always in drawing relationship with the crank axle.

The treadle drive of the present invention also permits driving the scooter in a reverse direction by merely changing the weight shifting from that required to drive it in the forward direction. As in the forward direction, the treadle drive achieves a driving relationship between the treadle and the crank axle through an arc much greater than 180°. This driving action is achieved for the same reasons as mentioned above in connection with driving the scooter in the forward direction.

As can be appreciated, one of the goals of a scooter-type vehicle is to provide a smooth driving arrangement so that propelling the scooter can be achieved by even the littlest of children. Furthermore, reduced complexity is required in order to price the scooter reasonably for sale as a toy-type device. This places limits on the complexity of the drive mechanism. With the present invention, the smallest of children are capable of driving the scooter in either the forward or reverse direction and as the treadles remain generally horizontal as they are reciprocated, children are able to easily maintain their balance on the scooter as they propel it. In use, the inventors have found that after a short learning period, most children are capable of readily reciprocating the treadles to propel the scooter in both directions and are capable of doing so at slower speeds as well as faster speeds. As explained above, slower speeds with the present invention are accommodated through the ability of the treadle drive to power the crank axle through an arc greater than 180°.

While the principal advantages and features of the present invention have been discussed above, a greater understanding thereof may be attained by referring to the drawings and description of the preferred embodiment which follow.

BRIEF DESCRIPTION OF THE DRAWINGS

FIG. 3 is a cross-sectional view taken along the plane of line 3—3 in FIG. 1 and detailing the treadle mounting and bar track arrangement;

FIG. 4 is a partial cross-sectional view taken along the plane of line 4—4 in FIG. 2 and detailing the bar track with the forward treadle ends and roller supports mounted thereon; and FIG. 5 is a partial cross-sectional view taken along the plane of line 5—5 in FIG. 3 further detailing the treadle roller mount to the bar track.

DETAILED DESCRIPTION OF THE PREFERRED EMBODIMENT

Figure 1:
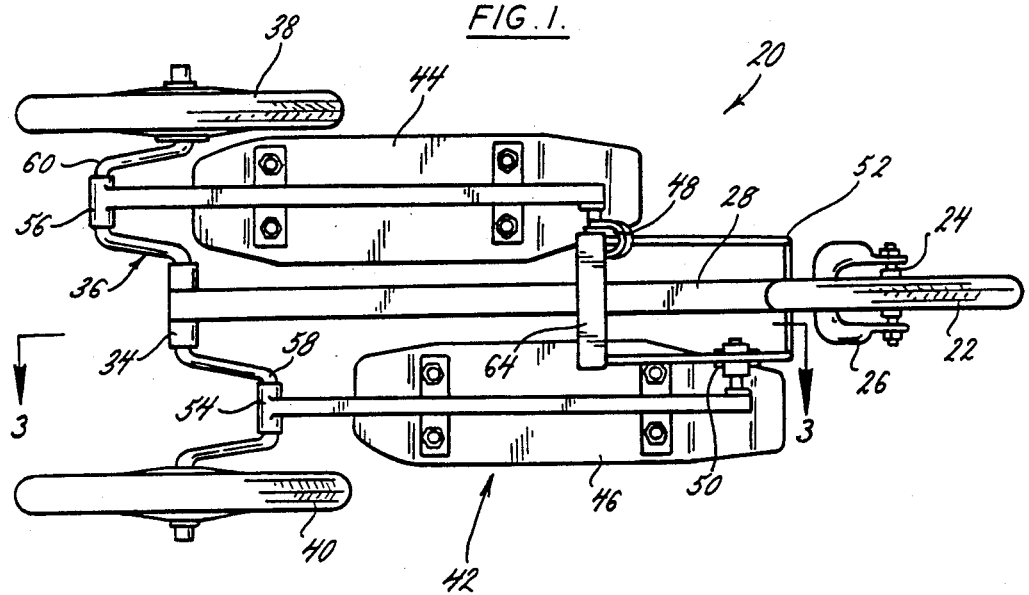
FIG. 1 is a bottom view of the three-wheeled scooter with reciprocating treadle drive, with the handlebars omitted for clarity.
Figure 2:
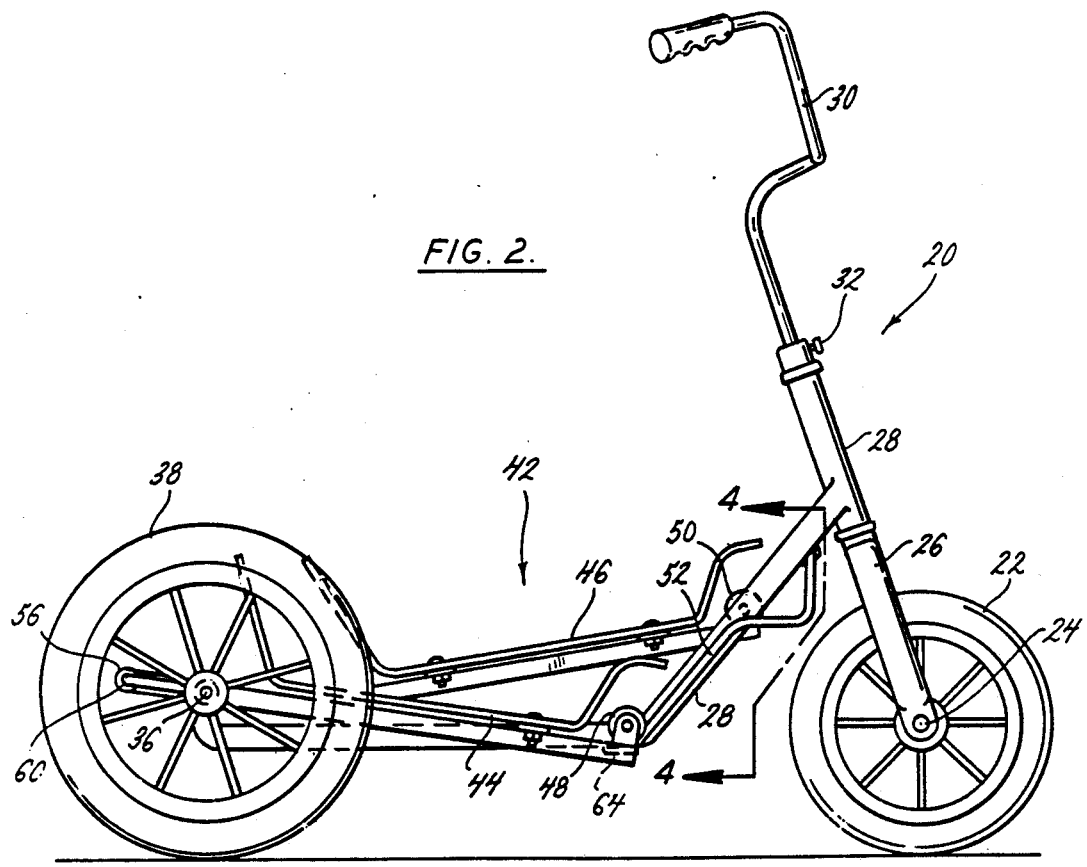
FIG. 2 is a side elevational view of the three-wheeled scooter with reciprocating treadle drive.

As shown in FIGS. 1 and 2, the three-wheeled scooter 20 of the present invention includes a forward wheel 22 which is rotatably supported by an axle 24 extending between the arms of a fork 26. Fork 26 is rotatably secured to the forward end of frame 28 and extends upwardly therethrough. A pair of handlebars 30 is mounted by a set screw 32 or the like, as known in the art, to the extension of fork 26 such that the handlebars 30 may be used to change the orientation of forward wheel 22 and thereby steer the three-wheel scooter 20.

Frame member 28 extends rearwardly along the central portion of the scooter 20 to an end bushing 34. A rear crank axle 36 is rotatably mounted to end bushing 34 and extends generally laterally of frame member 28. A pair of rear wheels 38, 40 are mounted at the outboard ends of crank axle 36 by suitable bearings, etc. as well known in the art. A reciprocating treadle drive 42 comprises essentially a pair of treadles 44, 46 mounted on opposite sides of frame member 28, each of which has its forward end supported by a roller 48, 50 from a bar track 52. The rear of each treadle 44, 46 is rotatably supported by a bushing 54, 56 from a crank portion 58, 60 of crank axle 36.

Referring now to FIGS. 3-5, treadle 46 is shown with its front roller 50 essentially vertically supported by a flattened portion 62 of bar track 52, bar track 52 being essentially a continuous bar which extends from a drag plate 64 upwardly to a bracket mount 66 and then downwardly on the other side of frame member 28 to the drag plate 64 once again. In order to maintain close contact between rollers 48, 50 and bar track 52, a pair of straps 68, 70 surround the bar track 52 and help prevent each of rollers 48, 50 from becoming untracked as the treadles 44, 46 are reciprocated in order to propel the scooter 20.

In operation, it should be first noted that the cranks of rear crank axle are situated 180° from each other. Additionally, it should be noted that as the crank moves to its most forward position, the front end of its associated treadle has its roller supported by the flattened portion of the bar track. As the crank rotates away from its forward position, the treadle roller associated therewith rolls down the inclined portion of the bar track. This movement away from the forward position of each crank may be in the upward direction (for reverse) or in the downward direction (forward motion). Thus, the treadles are maintained substantially horizontal as they are oscillated and throughout the entirety thereof. For propelling the scooter in either the forward or rearward direction, the general motion by a rider is the same, i.e. that of up and down reciprocating motion by alternately, shifting weight from one leg to the other as the rider stands on the treadles.

For propelling forward, in the position shown in FIG. 3 the rider's weight should be shifted to treadle 46. As shown therein, the forward roller 50 is supported by the flattened portion 62 of bar track 52 such that a torque is generated tending to move crank portion 58 in a clockwise direction. As crank portion 58 moves further clockwise than the position shown in FIG. 3, forward roller 50 rolls backward and the sloping incline of bar track 52 permits treadle 46 to move generally downward into a position 180° from that position generally shown in the drawings.

At that point, the rider should have already completed his shifting of his weight to the other treadle as the rear end of the other treadle will have crossed the apex of its associated crank portion of the drive axle such that weight shifted to that treadle will cause its associated crank portion to rotate clockwise and thereby finish driving its forward roller up the incline and onto the flattened portion of the bar track. From this analysis, it can be seen that each treadle can be used to drive the rear crank axle from a point just past the apex of its associated crank portion to a point where the forward roller is at the bottom of the incline portion of the bar track, as shown generally by the treadle 44 in FIG. 2. This range of travel is approximately 270° clockwise about the rear crank axle which completely eliminates any "dead spots" in the driving action as there is no point where at least one of the treadles is not in a driving relationship with the rear crank axle. Not only does this eliminate "dead spots", but it also provides for a smooth even ride as the rider has a range of area where his weight may be comfortably shifted from one treadle to the other and yet retain a driving force on the crank axle.

The operation of the treadle drive of the present invention has been discussed for forward motion. It should be understood to one of ordinary skill in the art that driving motion in the rearward direction is also possible using the same motions as in the forward direction, the crank axle instead being driven in a counter-clockwise direction. In order to change from forward to rearward direction, the rider may merely initiate movement by pushing from the ground in order to get the crank axle rotating in that direction, after which weight shifting from treadle to treadle is comfortably apparent and easily achievable. Alternately, the rider may bring the scooter to a stop with the treadles in positions other than at the extremes of their movement at which point the rider may then shift his weight from that required to move it in the forward direction and reinitiate movement except in the rearward direction. This change in direction is perhaps more difficult to explain than to achieve as it becomes readily apparent to those riders who have ridden prototypes of the present invention, keeping in mind that these have been small children.

There are various changes and modifications which may be made to the invention as would be apparent to those skilled in the art. However, these changes or modifications are included in the teaching of the disclosure, and it is intended that the invention be limited only by the scope of the claims appended hereto.

What is claimed is:

1. A vehicle having a pair of treadles, a drive axle, means for securing a rearward end of each treadle to said drive axle in a driving relationship, a track and roller supporting the forward end of each treadle from the vehicle, the forward end of each of said treadles having a roller mounted thereon, said rollers riding on their associated track as the treadles are oscillated, said track and roller having means for vertically supporting said associated end of each of said treadles through at least a portion of said treadle movement as a rider oscillates said treadles to thereby drive said drive axle and propel said vehicle.

2. The vehicle of claim 1 wherein said vertical support means comprises a generally flattened section in said track.

3. The vehicle of claim 2 wherein said drive axle includes a pair of opposing cranks, and wherein said securing means includes means for pivotally attaching said ends of said treadles to said cranks.

4. The vehicle of claim 3 wherein said treadles and their associated tracks have means for driving said drive axle in both the clockwise and counterclockwise direction.

5. The vehicle of claim 4 wherein said tracks and cranks have means for maintaining said treadles in a substantially horizontal orientation as said treadles are oscillated.

6. The vehicle of claim 5 wherein each of said tracks is a bar-type track, said rollers partially surrounding said track, and further comprising means for securing each of said tracks to its associated treadle end.

7. A vehicle having a treadle operated drive comprising a pair of reciprocating treadles connected to a pair of drive wheels, each said treadles having means for driving said drive wheels through an arc greater than 180° to thereby eliminate "dead spots" from said drive.

8. The vehicle of claim 7 wherein said treadle operated drive further comprises a roller secured to the end of each treadle associated with said tracks, said rollers being positioned to roll on said tracks and thereby support said treadle ends.

9. The vehicle of claim 8 wherein said treadle operated drive has means for driving the crank axle in either the clockwise or counter-clockwise direction.

10. In a vehicle having a pair of rear mounted drive wheels and a crank axle connected therebetween, the improvement comprising a reciprocating treadle operated drive, said drive comprising a pair of generally elongated treadles arranged side by side and on opposite sides of a central main frame member, the rear end of each treadle being pivotally connected to said crank axle, a one-piece bar-type track mounted to said main frame member and having portions extending generally parallel thereto, the forward end of each treadle having a roller for engaging said track in a rolling relationship thereto, each of said track portions having a generally horizontal section near its forward end and an inclined section extending rearwardly therefrom, said generally horizontal section being adapted for generally supporting the forward end of each of said treadles as their associated rollers roll thereon so that each of said treadles drives said crank axle through an arc greater than 180° in either the clockwise or counter-clockwise direction as said treadles are reciprocated.

11. The vehicle of claim 10 wherein the forward end of said main frame member is pivotally secured to a steering wheel with handlebars, and the rear end of said main frame member is pivotally secured to the crank axle, said vehicle thereby being a three-wheeled scooter.

* * * * *